(12) United States Patent
Shekhter et al.

(10) Patent No.: US 7,431,751 B2
(45) Date of Patent: Oct. 7, 2008

(54) MAGNESIUM REMOVAL FROM MAGNESIUM REDUCED METAL POWDERS

(75) Inventors: Leonid Natan Shekhter, Ashland, MA (US); Leonid Lanin, Belmont, MA (US); Anastasis M. Conlon, Canton, MA (US)

(73) Assignee: H.C. Starck Inc., Newton, MA (US)

( * ) Notice: Subject to any disclaimer, the term of this patent is extended or adjusted under 35 U.S.C. 154(b) by 510 days.

(21) Appl. No.: 10/953,163

(22) Filed: Sep. 29, 2004

(65) Prior Publication Data

US 2006/0065073 A1    Mar. 30, 2006

(51) Int. Cl.
*B22F 9/20*    (2006.01)
(52) U.S. Cl. ........................................ 75/369; 148/513
(58) Field of Classification Search ................ 148/513, 148/514
See application file for complete search history.

(56) References Cited

U.S. PATENT DOCUMENTS

| 1,602,542 | A | 10/1926 | Marden |
| 1,728,941 | A | 9/1929 | Marden et al. |
| 2,516,863 | A | 8/1950 | Gardner .......................... 75/84 |
| 2,881,067 | A | 4/1959 | Hivert et al. .................. 75/0.5 |
| 2,950,185 | A | 8/1960 | Hellier et al. ................. 75/0.5 |
| 3,647,420 | A | 3/1972 | Restelli .......................... 75/84 |
| 3,658,507 | A | 4/1972 | Gohin et al. ................ 75/0.5 B |
| 5,356,120 | A | 10/1994 | König et al. ................. 266/175 |
| 5,448,447 | A * | 9/1995 | Chang ........................ 361/529 |
| 6,171,363 | B1 | 1/2001 | Shekhter et al. ................ 75/369 |
| 6,558,447 | B1 | 5/2003 | Shekhter et al. ................ 75/252 |
| 2002/0066338 | A1 | 6/2002 | Shekhter et al. ................ 75/245 |
| 2002/0152842 | A1 | 10/2002 | Oda et al. ...................... 75/252 |
| 2003/0110890 | A1* | 6/2003 | He et al. ........................ 75/363 |
| 2004/0163491 | A1 | 8/2004 | Shekhter et al. ................ 75/245 |

FOREIGN PATENT DOCUMENTS

GB    2 231 883    11/1990

* cited by examiner

*Primary Examiner*—George Wyszomierski
(74) *Attorney, Agent, or Firm*—Connolly Bove Lodge & Hutz LLP

(57) ABSTRACT

A method of producing a refractory metal powder that includes providing a metal powder containing magnesium tantalate or magnesium niobate; and heating the powder in an inert atmosphere in the presence of magnesium, calcium and/or aluminum to a temperature sufficient to remove magnesium tantalate or magnesium niobate from the powder and/or heating the powder under vacuum to a temperature sufficient to remove magnesium tantalate or magnesium niobate from the powder, the heating steps being performed in any order. The metal powder can be formed into pellets at an appropriate sintering temperature, which can be formed into electrolytic capacitors.

26 Claims, No Drawings

MAGNESIUM REMOVAL FROM MAGNESIUM REDUCED METAL POWDERS

FIELD OF THE INVENTION

This invention relates to the production of tantalum, niobium and other refractory or valve metal powders, as well as metal suboxide powders or alloys thereof.

BACKGROUND OF THE INVENTION

Refractory metals are members of a group of elements that are difficult to isolate in pure form because of the stability of their compounds, such as oxides, chlorides and fluorides. Since the manufacturing of refractory metals is very complex, we will use tantalum extractive metallurgy as an example to illustrate the development of this technology.

State of the art tantalum powder production is based on the process of reducing potassium heptafluorotantalate ($K_2TaF_7$) with sodium (sodium reduction). The modern method for manufacturing tantalum was developed by Hellier and Martin (U.S. Pat. No. 2,950,185). A molten mixture of $K_2TaF_7$ and a diluent salt, typically NaCl, KF and/or KCl, is reduced with molten sodium in a stirred reactor. The manufacturing process requires the removal of the solid reaction products from the retort, separation of the tantalum powder from the salts by leaching with dilute mineral acid, and treatments like agglomeration and deoxidation to achieve specific physical and chemical properties. While the reduction of $K_2TaF_7$ with sodium has allowed the industry to make high performance, high quality tantalum powders primarily used in solid tantalum capacitor manufacturing; there are several drawbacks to this method. It is a batch process prone to the inherent variability in the system; as a result, batch-to-batch consistency is difficult. Using diluent salts adversely impacts the throughput. The removal of chlorides and fluorides in large quantities presents an environmental issue. Of fundamental significance, the process has evolved to a state of maturity such that a significant advance in the performance of the tantalum powder produced is unlikely.

Over the years, numerous attempts were made to develop alternate ways for reducing tantalum compounds to the metallic state (U.S. Pat. Nos. 1,602,542; 1,728,941; 2,516,863; 3,647,420; and 5,356,120). Among these was the use of active metals other than sodium, such as calcium, magnesium, and aluminum, and raw materials such as tantalum pentoxide and tantalum chloride.

Kametani et al. (GB 2231883) developed a process for reducing gaseous titanium tetrachloride with atomized molten magnesium or sodium in a vertical type reactor in the temperature range of 650-900° C. Though the reaction was very exothermic, it was not self-sustaining due to a special effort designed to avoid the formation of titanium-iron intermetallic compounds at high temperatures (the melting point of Fe—Ti eutectic is 1080°).

U.S. Pat. Nos. 1,602,542, 3,658,507 and 2,881,067 suggest the use of gaseous magnesium to better control the process parameters. The gaseous reducing agent was generated in-situ from a mixture of metal oxide and reducing agent, or outside the reactor enclosure. Patentees managed to produce at bench scale fine zirconium, titanium, tungsten, molybdenum and chromium powders. The method was of batch type. The only controlled parameter was the magnesium (calcium) partial pressure. The kinetics and the temperature of the charge were a function of the gaseous magnesium (calcium) flow rate and were impossible to control due to the condensation of magnesium (calcium) on the cold parts of the reactor. Since both melting and evaporation of Mg (Ca) without condensation on the cold parts was practically impossible, the process had to be periodically stopped for the removal of the buildup. Therefore, continuous operation could not be carried out.

Numerous attempts have been made to produce tantalum and niobium powders by metalothermic reduction of their oxides with Mg, Al or Ca in a bomb type reactor (U.S. Pat. Nos. 1,728,941 and 2,516,863). A blend of finely-divided oxide and metal reducing agent was placed into a reactor and then ignited. The temperature could not be controlled and therefore it was not possible to achieve reproducible physical and chemical properties of the metal powders. The residual Mg (Al, Ca) content was high due to the formation of tantalates and niobates. The process was found to be unsuitable for manufacturing high quality capacitor grade powders.

Shekhter et al. (U.S. Pat. No. 6,171,363) described a method for controlled reduction of tantalum and niobium oxide with gaseous magnesium to produce capacitor grade tantalum and niobium powders (batch magnesium reduction). The key is control of the reaction process to achieve essentially isothermal conditions. The batch magnesium reduction process requires excess amount of magnesium to compensate for its condensation on the cold parts of the furnace.

The process disclosed by Shekhter et al. was advantageous compared to the traditional sodium reduction process. For example, there are no fluorine bearing compounds and there is no need to use any diluent salt.

U.S. Patent Application Publication Nos. 2002/0066338 and 2004/0163491, both to Shekhter et al., disclose a method of making high purity refractory metals suitable for use in electrical, optical and mill product/fabricated parts produced from their respective oxides by metalothermic reduction of a solid or liquid form of such oxide using a reducing agent selected from magnesium, calcium, and aluminum that establishes (after ignition) a highly exothermic reaction, the reaction preferably taking place in a continuously or step-wise moving oxide such as gravity fall with metal retrievable at the bottom and an oxide of the reducing agent being removable by leaching or in other convenient form and unreacted reducing agent derivatives being removable by leaching or like process.

Unlike metal after sodium reduction, the magnesium reduced powders contain tangible amounts of magnesium after magnesium reduction. Depending on the reduction conditions used, i.e., excess Mg, temperature, residence time, oxide/magnesium particle size, etc., the magnesium content in the powder can vary from 0.02 to 7% by weight.

According to X-ray diffraction analysis in tantalum/niobium powders, the magnesium does not exist in the elemental form but forms complex oxide compounds referred to as magnesium tantalate/niobates. In particular, the X-ray diffraction pattern was used to identify the chemical formula of a particular oxide present as $Mg_4Ta_2O_9$. Tangible quantities of magnesium tantalate/niobates can adversely affect physical, chemical, and electrical properties, thus, the conversion of magnesium tantalate/niobates into metals is an important issue.

It is a principle object of the present invention to provide a new process for producing high performance, high quality tantalum, niobium, and other refractory metals and blends or alloys thereof by reducing solid/liquid metal oxides in a steady, self-sustaining reaction zone, thereby eliminating one or more, and preferably all, of the problems associated with the traditional double salt reduction and other processes described above, while minimizing or eliminating the presence of magnesium tantalate/niobates.

SUMMARY OF THE INVENTION

The present invention is directed to a method of producing a refractory metal powder that includes providing a metal powder containing magnesium tantalate or magnesium niobate; and heating the powder in an inert atmosphere in the presence of magnesium, calcium and/or aluminum to a temperature sufficient to remove magnesium tantalate or magnesium niobate from the powder and/or heating the powder under vacuum to a temperature sufficient to remove magnesium tantalate or magnesium niobate from the powder, the heating steps being performed in any order.

The present invention additionally provides refractory metal powder obtained according to the above-described method. The present invention is also directed to forming the above-described powder into pellets at an appropriate sintering temperature and forming the sintered pellets into electrolytic capacitors.

DETAILED DESCRIPTION OF THE INVENTION

Other than in the operating examples or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

The present invention provides a method of producing a refractory metal powder that includes:

(A) providing a metal powder containing magnesium tantalate or magnesium niobate; and (B) heating the powder in an inert atmosphere in the presence of magnesium, calcium and/or aluminum to a temperature sufficient to remove magnesium tantalate or magnesium niobate from the powder and/or heating the powder under vacuum to a temperature sufficient to remove magnesium tantalate or magnesium niobate from the powder, the heating steps being performed in any order.

The metal powder containing magnesium can be obtained by methods known in the art, as a non-limiting example, by the methods disclosed in U.S. Pat. Nos. 1,602,542, 1,728,941, 2,516,863, 2,881,067, 2,950,185, 3,647,420, 5,356,120, and 6,171,363, U.S. Patent Application Publication Nos. 2002/0066338 and 2004/0163491, as well as GB 2231883, the relevant portions of each are incorporated herein by reference.

Depending on the reduction conditions used, i.e., excess Mg, temperature, residence time, oxide/magnesium particle size, etc., the magnesium content in the powder resulting from the process can vary from 0.02 to 7%.

In an embodiment of the invention, the process involves blending a metal powder with 1-15 percent magnesium and heating to achieve the reduction process. The magnesium is in the molten state during a portion of the heating time. In this case, the objective is to remove 1000-3000 ppm oxygen and only a low concentration of MgO is produced. However, when a much greater quantity of tantalum oxide is reduced a large quantity of magnesium oxide is generated. The resulting mixture of magnesium, tantalum oxide and magnesium oxide can form tantalum-magnesium-oxygen complexes that are difficult to separate from the tantalum metal.

Different types of equipment can be used to run the reduction process, in some cases continuously, such as a vertical tube furnace, a rotary kiln, a fluid bed furnace, a multiple hearth furnace, and an SHS (self-propagation high-temperature synthesis) reactor.

According to X-ray diffraction analysis in tantalum/niobium powders, the magnesium does not exist in the elemental form but forms complex oxide compounds referred to as magnesium tantalate/niobates. As a non-limiting example, X-ray diffraction patterns obtained from tantalum powders have been used to identify the chemical formula of a particular oxide present as $Mg_4Ta_2O_9$. Tangible quantities of magnesium tantalate/niobates can adversely affect physical, chemical, and electrical properties, thus, the conversion of magnesium tantalate/niobates into metals is an important issue.

The present process provides for both agglomeration (heating under vacuum) and deoxidation (heating in the presence of a reducing agent such as magnesium, calcium and/or aluminum), which causes the decomposition of the magnesium tantalate/niobates. This result is surprising as there are no thermodynamic data that predict the thermal stability of the complex oxides, i.e., no prior art could be found that provided any insight as to the stability or instability of the magnesium tantalate/niobates, yet it has now been established that these compounds can be decomposed and removed during downstream processing. As a result, the magnesium content in the resulting niobium/tantalum powder can be significantly reduced to, in many cases, undetectable levels.

Agglomeration or heating under vacuum, according to the present invention is carried out by heating the metal powder under vacuum at from 1,100° C. to 1,400° C., in some cases from 1150° C. to 1350° C., in other cases from 1200° C. to 1300° C., and in some situations from 1225° C. to 1375° C. for from 15 minutes to 6 hours, in some cases from 15 minutes to 5 hours, in 15 other cases from 30 minutes to 4 hours, and in some instances from 30 minutes to 2 hours.

Deoxidation or reduction according to the present invention is carried out by heating the metal powder at a temperature of from 800° C. to 1,300° C., in some cases from 850° C. to 1050° C., and in other cases from 875° C. to 925° C. in the presence of a reducing agent such as magnesium, calcium and/or aluminum, which can be carried out for from 15 minutes to 6 hours, in some cases from 30 minutes to 5 hours, in other cases from 1 hour to 4 hours, and in some instances from 2 hours to 4 hours.

In the reduction step, the reducing agent is used at a level of at least 0.01%, in some cases at least 0.1% and in other cases at least 1% based on the weight of the metal powder. Also, the reducing agent can be used in an amount up to 15%, in some cases 5%, and in other cases up to 2% based on the weight of the metal powder. The amount of reducing agent will be an amount sufficient to sufficiently remove magnesium tantalate/niobates from the metal powder under the reduction conditions employed. The amount of reducing agent used can be any value or can range between any of the values recited above.

In an embodiment of the invention, the resulting metal powder is free-flowing.

The downstream processing (heating) steps can be performed in various types of equipment, in some cases continuously. Non-limiting examples of suitable equipment include a rotary kiln, a fluid bed furnace, a multiple hearth furnace, a pusher furnace, vacuum furnaces, vacuum pusher furnaces and combinations thereof.

In an embodiment of the invention, the present method of producing a refractory metal powder can include forming a magnesium-containing metal powder by (a) combining (i) an oxide particle component and (ii) a reducing agent; (b) forming a mixture of (i) and (ii); (c) continuously feeding the mixture into a furnace; (d) igniting the mixture at a reaction zone and starting a reaction that is sufficiently exothermic to form a high temperature flash; (e) starting a reaction that is sufficiently exothermic to form a high temperature self-sustaining flash; (f) producing a free-flowing metal powder containing magnesium tantalate or magnesium niobate; and (g) heating the metal powder under vacuum and/or performing a reduction step as described above, in any order at a temperature sufficient to remove magnesium tantalate or magnesium niobate from the metal powder.

Typically, the metal powder resulting from (f) contains magnesium tantalate and/or magnesium niobate at a level of from 0.002 wt. % to 7 wt. %, in some cases 0.01 wt. % to 6 wt. % and in other cases at a level of from 0.1 wt. % to 5 wt. % based on the weight of the powder. In an embodiment of the invention, the heating in step (g) is analogous to the heating step (B) as described above.

In a particular embodiment of the invention, the heating step (B) is a reduction step and is carried in the presence of Mg, Ca, and/or Al, out at a temperature of from 800° C. to 1,300° C., in some cases from 850° C. to 1050° C., and in other cases from 875° C. to 925° C., which can be carried out for from 15 minutes to 6 hours, in some cases from 30 minutes to 5 hours, in other cases from 1 hour to 4 hours, and in some instances from 2 hours to 4 hours. In another embodiment of the invention, the reduction step is conducted in the presence of a suitable inert gas. Any suitable inert gas can be used. Suitable inert gases include, but are not limited to neon and argon.

In another particular embodiment of the invention, the heating step (B) is performed under vacuum, which can be carried out by heating at from 1,100° C. to 1,400° C., in some cases from 1150° C. to 1350° C., in other cases from 1200° C. to 1300° C., and in some situations from 1225° C. to 1375° C. for from 15 minutes to 6 hours, in some cases from 15 minutes to 5 hours, in other cases from 30 minutes to 4 hours, and in some instances from 30 minutes to 2 hours. Typically, when heating under vacuum, no reducing agent is present.

In a particular embodiment of the invention, step (B) involves two steps and is carried out by
  i) heating the metal powder under vacuum at 1,100° C. to 1,400° C. for from 15 minutes to 6 hours, and
  ii) heating the powder in the presence of a reducing agent at 800° C. to 1,300° C. for from 1 to 6 hours.

In another particular embodiment of the invention, step (B) involves two steps and is carried out by
  i) heating the powder in the presence of a reducing agent at 800° C. to 1,300° C. for from 1 to 6 hours; and
  ii) heating the metal powder under vacuum at 1,100° C. to 1,400° C. for from 15 minutes to 6 hours.

After heating step (B), the magnesium content of the metal powder is typically less than 500 ppm, in most cases less than 100 ppm, in some instance less than 50 ppm and in other instances less than 25 ppm.

A particular embodiment of the invention provides a method of producing a refractory metal powder. The method includes:
  (a) combining (i) an oxide particle mixture containing oxide particles selected from refractory metal oxide particles, refractory metal alloy oxide particles, refractory metal suboxide powders, refractory metal alloy suboxide powders and mixtures thereof and (ii) a reducing agent selected from magnesium, aluminum, calcium and mixtures thereof;
  (b) forming a substantially uniform mixture of (i) and (ii);
  (c) continuously feeding the mixture into a furnace;
  (d) igniting the mixture at a reaction zone and starting a reaction that is sufficiently exothermic to form a high temperature flash;
  (e) producing a free-flowing metal powder selected from refractory metal powders, refractory metal alloy powders, and mixtures thereof; where the mixture is introduced at a consistently constant rate and the second temperature remains substantially constant; and
  (f) performing a reduction step and/or heating under vacuum, as described above, in any order.

A further particular embodiment of the invention provides a method of producing a refractory metal powder that includes:
  (I) combining (i) an oxide particle mixture containing oxide particles selected from refractory metal oxide particles, refractory metal alloy oxide particles, refractory metal suboxide powders, refractory metal alloy suboxide powders and mixtures thereof and (ii) a reducing agent selected from magnesium, aluminum, calcium and mixtures thereof;
  (II) forming a substantially uniform mixture of (i) and (ii);
  (III) reducing the free-flowing mixture in a reaction zone by heating the mixture in a reaction vessel to create a highly exothermic reaction, the exothermic reaction being triggered by heating the mixture to an ignition temperature or by adding a further reagent or catalyst;
  (IV) recovering a high surface area powder, containing magnesium tantalate and/or magnesium niobate, which is selected from refractory metal powders, refractory metal alloy powders, refractory metal suboxide powders and refractory metal alloy suboxide powders; and
  (V) performing a reduction step and/or heating under vacuum, as described above, in any order.

In the various embodiments of the invention, the refractory metal oxide component can be selected from tantalum pentoxide, niobium pentoxide, niobium suboxide, tungsten trioxide, chromium trioxide, molybdenum trioxide, titanium dioxide, vanadium pentoxide and niobium oxide, mixtures of at least one of the foregoing and zirconium dioxide, and mixtures thereof.

Also, in the various embodiments of the invention, the refractory metal powder and the refractory metal alloy powder can be selected from tantalum, niobium, molybdenum, tungsten, vanadium, chromium, titanium and combinations thereof.

Additionally, in the various embodiments of the invention, the reducing agent in the mixture can be provided in an amount substantially equal to the stoichiometric quantity required to react with the refractory metal oxide component.

In an embodiment of the invention, the powder can be formed into pellets at an appropriate sintering temperature. Further to this embodiment, the sintered pellets can be formed into electrolytic capacitors.

The present invention is more particularly described in the following examples, which are intended to be illustrative only, since numerous modifications and variations therein will be apparent to those skilled in the art. Unless otherwise specified, all parts and percentages are by weight.

EXAMPLES

Example 1

Niobium pentoxide was blended with solid magnesium to form a substantially uniform mixture. The mixture was continuously fed to a vertical tube furnace at 10 kg/hr. The flash temperature in the furnace was near, but less than, the melting point of niobium pentoxide. The procedure produced a metal powder as with the properties described in Table 1.

Example 2

Tantalum pentoxide was blended with solid magnesium to form a substantially uniform mixture. The mixture was continuously fed to a vertical tube furnace at 20 kg/hr. The flash temperature was near, but less than, the melting point of tantalum pentoxide. The procedure produced a metal powder with the properties as described in Table 1.

TABLE 1

| | Surface Area ($m^2/g$) | O (ppm) | N (ppm) | C (ppm) | Si (ppm) | H (ppm) | Mg (ppm) |
|---|---|---|---|---|---|---|---|
| Example 1 | 5.9 | 19150 | 115 | 120 | 20 | 210 | 825 |
| Example 2 | 8.8 | 53000 | 500 | 210 | 390 | — | 1160 |

Vacuum heated samples of the powders from Examples 1 and 2 were obtained by heating under vacuum in a SUPER VII® High Temperature Vacuum Furnace, Centorr Vacuum Industries, Nashua, NH (I kg). Reduced samples were obtained by magnesium reduction (100% excess) conducted in a horizontal tube furnace (500 g). Conditions and results are summarized in Table 2 (vacuum heating) and Table 3 (reduction).

The results show that both heating under vacuum and reduction downstream processing steps result in significantly less magnesium tantalate/niobate in the resulting metal powder. The results demonstrate that the magnesium tantalate/niobates can be eliminated using downstream processing. As a result, magnesium content is significantly reduced in the resulting niobium/tantalum powder.

It is to be understood that the above-described embodiments are simply illustrative of the principles of the invention. Various and other modifications, changes, details and uses may be made by those skilled in the art which will embody the principles of the invention and fall within the spirit and scope thereof.

What is claimed is:

1. A method of producing a refractory metal powder comprising:
   (A) heating a mixture comprising a metal oxide powder and magnesium at a flash temperature to produce a metal powder containing magnesium tantalate or magnesium niobate wherein said magnesium in the mixture is in an amount substantially equal to the stoichiometric quantity required to react with the metal oxide, and said flash temperature is near but less than the melting point of the metal oxide; and
   (B) heating the powder in an inert atmosphere in the presence of a reducing agent to a temperature sufficient to remove magnesium tantalate or magnesium niobate from the powder (reduction step) and heating the powder under vacuum to a temperature sufficient to remove magnesium tantalate or magnesium niobate from the powder (heating under vacuum step), the reduction step and heating under vacuum step can be performed in any order.

2. The method according to claim 1, wherein the metal powder is tantalum or niobium and is free-flowing.

3. The method according to claim 1, wherein the reducing agent in step (B) is selected from the group consisting of magnesium, aluminum, calcium, and combinations thereof.

TABLE 2

Vacuum Heating

| | Starting Powder | Temp (° C.) | Time (hrs.) | Surface Area ($m^2/g$) | O (ppm) | N (ppm) | C (ppm) | Si (ppm) | H (ppm) | Mg (ppm) |
|---|---|---|---|---|---|---|---|---|---|---|
| A-1 | Example 1 | 1300 | 1 | 0.6 | 19700 | 70 | 70 | 20 | 80 | <20 |
| A-2 | Example 2 | 1100 | 0.5 | 4.5 | 69100 | 580 | 135 | 430 | — | 580 |
| A-3 | Example 2 | 1200 | 0.5 | 2.3 | 70600 | 410 | 155 | 680 | — | 260 |

TABLE 3

Reduction

| | Starting Powder | Temp. (° C.) | Time (hrs.) | Surface Area ($m^2/g$) | O (ppm) | N (ppm) | C (ppm) | Si (ppm) | Mg (ppm) |
|---|---|---|---|---|---|---|---|---|---|
| D-1 | A-2 | 950 | 2.0 | 6.1 | 17600 | 460 | 200 | 460 | 66 |
| D-2 | A-2 | 1000 | 2.0 | 4.4 | 12900 | 520 | 200 | 455 | 32 |
| D-3 | A-3 | 950 | 2.0 | 4.9 | 14800 | 470 | 260 | 460 | 66 |
| D-4 | A-3 | 1000 | 4.0 | 4.1 | 9970 | 415 | 240 | 435 | 40 |

4. The method according to claim 1, wherein the temperature in (B) is a temperature at which the magnesium tantalate or magnesium niobate is unstable.

5. The method according to claim 1, wherein the reduction step in (B) is conducted in the presence of an inert gas.

6. The method according to claim 5, wherein the inert gas is selected from neon and argon.

7. The method according to claim 1, wherein the temperature in the reduction step in (B) is from 800° C. to 1,300° C.

8. The method according to claim 1, wherein the temperature in the heating under vacuum step in (B) is from 1,100° C. to 1,400° C.

9. The method according to claim 1, wherein the temperature in the reduction step in (B) is from 875° C. to 925° C. for from 2 to 4 hours.

10. The method according to claim 1, wherein the reduction step in (B) is carried out by heating the powder under vacuum at 1,100° C. to 1,400° C. for from 15 minutes to 6 hours.

11. The method according to claim 1, wherein step (B) is carried out by
   I) heating the metal powder under vacuum at 1,100° C. to 1,400° C. for from 15 minutes to 6 hours, and
   ii) heating the powder in the presence of a reducing agent at 800° C. to 1,300° C. for from 1 to 6 hours.

12. The method according to claim 11, wherein the heating step (ii) is conducted in the presence of an inert gas.

13. The method according to claim 12, wherein the inert gas is selected from neon and argon.

14. The method according to claim 1, wherein step (B) is carried out by
   I) heating the powder in the presence of a reducing agent at 800° C. to 1,300° C. for from 1 to 6 hours; and
   ii) heating the metal powder under vacuum at 1,100° C. to 1,400° C. for from 15 minutes to 6 hours.

15. The method according to claim 14, wherein the heating step (i) is conducted in the presence of an inert gas.

16. The method according to claim 15, wherein the inert gas is selected from neon and argon.

17. The method according to claim 1, wherein the magnesium tantalate and/or magnesium niobate in (A) are present at from 0.02 wt. % to 7 wt. % based on the weight of the metal powder.

18. The method according to claim 1, wherein after step (B), the magnesium tantalate and/or magnesium niobate are present at less than 500 ppm.

19. The method according to claim 1, further comprising forming the refractory metal powder into pellets at an appropriate sintering temperature.

20. The method according to claim 19, further comprising forming the sintered pellets into electrolytic capacitors.

21. The method as claimed in claim 1, wherein the reducing agent is present in an amount from 1% to 2% based on the weight of the metal powder.

22. A method of producing a refractory metal powder comprising:
   (A) heating a mixture comprising a metal oxide powder and magnesium at a flash temperature to produce a metal powder containing magnesium tantalate or magnesium niobate wherein said magnesium in the mixture is in an amount substantially equal to the stoichiometric quantity required to react with the metal oxide, and said flash temperature is near but less than the melting point of the metal oxide; and
   (B) heating the powder under vacuum to a temperature sufficient to remove magnesium tantalate or magnesium niobate from the powder.

23. A method of producing a refractory metal powder comprising:
   (A) heating a mixture comprising a metal oxide powder and magnesium at a flash temperature to produce a metal powder containing magnesium tantalate or magnesium niobate wherein said magnesium in the mixture is in an amount substantially equal to the stoichiometric quantity required to react with the metal oxide, and said flash temperature is near but less than the melting point of the metal oxide; and
   (B) heating the powder in an inert atmosphere in the presence of a reducing agent at a temperature from 875°C. to 1,300° C. in order to remove magnesium tantalate or magnesium niobate from the powder (reduction step) and/or heating the powder under vacuum to a temperature sufficient to remove magnesium tantalate or magnesium niobate from the powder (heating under vacuum step), the reduction step and heating under vacuum step can be performed in any order.

24. The method as claimed in claim 23, wherein the temperature in the reduction step is from 875°C. to 925°C.

25. The method as claimed in claim 24, wherein the reducing agent is present in an amount from 1% to 2% based on the weight of the metal powder.

26. The method as claimed in claim 23, wherein the reducing agent is present in an amount from 0.1% to 5% based on the weight of the metal powder.

* * * * *